US010011535B2

(12) United States Patent
La Forest et al.

(10) Patent No.: US 10,011,535 B2
(45) Date of Patent: Jul. 3, 2018

(54) SACRIFICIAL FIBERS TO CREATE CHANNELS IN A COMPOSITE MATERIAL

(71) Applicant: Honeywell International Inc., Morristown, NJ (US)

(72) Inventors: Mark L. La Forest, Granger, IN (US); Slawomir T. Fryska, Granger, IN (US); David M. Wright, Voglers Cove (CA)

(73) Assignee: Honeywell International Inc., Morris Plains, NJ (US)

( * ) Notice: Subject to any disclaimer, the term of this patent is extended or adjusted under 35 U.S.C. 154(b) by 386 days.

(21) Appl. No.: 14/475,181

(22) Filed: Sep. 2, 2014

(65) Prior Publication Data

US 2016/0060115 A1  Mar. 3, 2016

(51) Int. Cl.
*B05D 5/12* (2006.01)
*C04B 35/83* (2006.01)
*D06M 10/10* (2006.01)
*D06M 15/37* (2006.01)
*B29B 11/16* (2006.01)
*C04B 35/628* (2006.01)
*C04B 41/00* (2006.01)
*C04B 41/45* (2006.01)
*C01B 32/05* (2017.01)
*C04B 35/185* (2006.01)
*C04B 35/195* (2006.01)
*C04B 35/478* (2006.01)
*B29K 307/04* (2006.01)

(52) U.S. Cl.
CPC .............. *C04B 35/83* (2013.01); *B29B 11/16* (2013.01); *C01B 32/05* (2017.08); *C04B 35/185* (2013.01); *C04B 35/195* (2013.01); *C04B 35/478* (2013.01); *C04B 35/62873* (2013.01); *C04B 35/62886* (2013.01); *C04B 41/009* (2013.01); *C04B 41/0072* (2013.01); *C04B 41/4515* (2013.01); *C04B 41/4529* (2013.01); *C04B 41/4531* (2013.01); *D06M 10/10* (2013.01); *D06M 15/37* (2013.01); *B29K 2307/04* (2013.01); *C04B 2235/48* (2013.01); *C04B 2235/606* (2013.01)

(58) Field of Classification Search
USPC ....................................................... 427/227
See application file for complete search history.

(56) References Cited

U.S. PATENT DOCUMENTS

| | | |
|---|---|---|
| 3,734,797 A | 5/1973 | Byers |
| 4,615,855 A | 10/1986 | Orlowski et al. |
| 4,659,624 A | 4/1987 | Yaeger et al. |
| 4,986,943 A | 1/1991 | Sheaffer et al. |
| 5,405,560 A | 4/1995 | Chareire et al. |
| 5,705,008 A | 1/1998 | Hecht |
| 2004/0058154 A1 | 3/2004 | Lau et al. |
| 2004/0211354 A1 | 10/2004 | Guirman et al. |
| 2004/0241078 A1* | 12/2004 | Inoue ................. D03D 15/00 423/447.1 |
| 2006/0279012 A1 | 12/2006 | Simpson et al. |
| 2007/0007678 A1* | 1/2007 | Benitsch ............ C04B 35/573 264/29.1 |
| 2008/0090064 A1* | 4/2008 | James ................ C04B 35/573 428/292.1 |
| 2008/0141938 A1* | 6/2008 | Chandran ........... C04B 35/44 118/723 E |
| 2008/0224343 A1 | 9/2008 | Baldwin et al. |
| 2009/0169836 A1* | 7/2009 | Thomas .............. B32B 5/26 428/196 |
| 2010/0035126 A1* | 2/2010 | Breault ............... D04H 1/42 429/532 |
| 2011/0275266 A1 | 11/2011 | Lecostaouec |
| 2012/0156466 A1* | 6/2012 | Bell .............. C04B 35/62204 428/297.4 |
| 2013/0214442 A1* | 8/2013 | Naskar .............. D04H 1/4242 264/29.2 |
| 2013/0231024 A1* | 9/2013 | Lecostaouec ......... D03D 3/08 442/211 |

(Continued)

FOREIGN PATENT DOCUMENTS

| | | |
|---|---|---|
| EP | 2267081 A1 | 12/2010 |
| WO | 0218120 A2 | 3/2002 |
| WO | 2004052629 A1 | 6/2004 |

OTHER PUBLICATIONS

Gilman et al., Thermal Decomposition Chemistry of Poly(vinyl alcohol), Aug. 1994.*
Search Report from counterpart European Application No. 1518891.1, dated Jan. 29, 2016, 8 pages.
Savage, "Carbon-Carbon Composites; section 5.8, Low-Pressure Composites Processing," Springer, 1993, 2 pp.
Extended Search Report from European Application No. 15181890.3, dated Dec. 4, 2015, 7 pp.
Response to Examination Report dated Jan. 29, 2016, from counterpart European Application No. 15181891.1, filed Jun. 13, 2016, 12 pp.

(Continued)

*Primary Examiner* — Austin Murata
(74) *Attorney, Agent, or Firm* — Shumaker & Sieffert, P.A.

(57) ABSTRACT

A technique of heating a mixture of fibers that includes sacrificial fibers and carbon fiber precursor fibers to a temperature between about 170° C. and about 400° C., such that the sacrificial fibers are substantially removed and a plurality of channels remain in a preform precursor, and carbonizing the carbon fiber precursor fibers to form a porous carbon fiber preform. Also disclosed is a technique of heating a mixture of fibers that includes sacrificial fibers and carbon fibers to a temperature between about 170° C. and about 400° C., such that the sacrificial fibers are substantially removed and a plurality of channels remain, and infiltrating a densifying agent into at least the plurality of channels. Also disclosed is an article including a mixture of fibers that includes sacrificial fibers and carbon fiber precursor fibers or carbon fibers.

14 Claims, 4 Drawing Sheets

(56) References Cited

U.S. PATENT DOCUMENTS

2015/0005151 A1* 1/2015 Baba .................... C04B 35/573
501/90
2016/0046491 A1* 2/2016 Mihara .................. C01B 31/00
428/312.2
2016/0102023 A1 4/2016 La Forest et al.

OTHER PUBLICATIONS

Examination Report from counterpart European Application No. 15181891.1-1706, dated Apr. 18, 2017, 4 pp.
Final Office Action from U.S. Appl. No. 14/475,222, dated Jun. 15, 2017, 15 pp.
Examination Report from counterpart European Application No. 15181891.1, dated Nov. 27, 2017, 6 pp.
Response to Article 94(3) EPC Communication dated Apr. 18, 2017, from counterpart European Application No. 15181891.1, filed on Aug. 17, 2017, 10 pp.
Prosecution History from U.S. Appl. No. 14/475,222 dated Aug. 4, 2016 through Dec. 8, 2017, 75 pp.
Response to Examination Report dated Nov. 27, 2017, from counterpart European Application No. 15181891.1, filed Feb. 20, 2018, 9 pp.
Office Action from U.S. Appl. No. 15/285,589, dated Apr. 19, 2018, 11 pp.
Notice of Allowance from U.S. Appl. No. 14/475,222, dated Apr. 9, 2018, 5 pp.

* cited by examiner

SACRIFICIAL FIBERS TO CREATE CHANNELS IN A COMPOSITE MATERIAL

TECHNICAL FIELD

The disclosure relates to the manufacture of composite materials.

BACKGROUND

In some preform and carbon-carbon composite material manufacturing processes, gases may be generated inside a preform or preform precursor being processed, or the manufacturing processes may utilize gases or liquids that penetrate the preform from the outside. The rate at which gases may penetrate or evacuate a preform can depend on, among other things, gas diffusion rates and the porosity of the preform.

SUMMARY

In general, the disclosure describes techniques utilizing sacrificial fibers that may be substantially removed from a mixture of fibers by heating to a temperature between about 170° C. and about 400° C. in a precursor of a carbon-carbon composite material. In some examples, the sacrificial fibers may be mixed, incorporated into tows, needled, or otherwise combined with carbon fiber precursor fibers or carbon fibers to form a workpiece, such as a preform, woven or non-woven fabric, composite part, or intermediary thereof. Heating of the sacrificial fibers may result in formation of additional porosity in the form of channels in the workpiece. The increased porosity may allow for enhanced ingress and/or egress of gases, liquids, or other volatiles with respect to inner portions of the workpiece being processed.

In some examples, a technique of this disclosure may include heating a mixture of fibers comprising sacrificial fibers and a plurality of carbon fiber precursor fibers to a temperature between about 170° C. and about 400° C. to substantially remove the sacrificial fibers from the mixture of fibers and form a plurality of channels in a preform precursor between the plurality of carbon fiber precursor fibers in place of the sacrificial fibers. This example technique also may include carbonizing the plurality of carbon fiber precursor fibers to form a porous carbon fiber preform comprising the plurality of channels.

In another example of this disclosure, a technique includes heating a mixture of fibers comprising sacrificial fibers and carbon fibers to a temperature between about 170° C. and about 400° C. to substantially remove the sacrificial fibers from the mixture and form a plurality of channels between the carbon fibers in a carbon fiber preform in place of the sacrificial fibers. This example technique also may include infiltrating a densifying agent into at least the plurality of channels of the carbon fiber preform.

In another example of this disclosure, an article includes a mixture of fibers that includes a plurality of sacrificial fibers, where each sacrificial fiber has a temperature of substantial removal between about 170° C. and about 400° C., and a plurality of carbon fiber precursor fibers or a plurality of carbon fibers.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
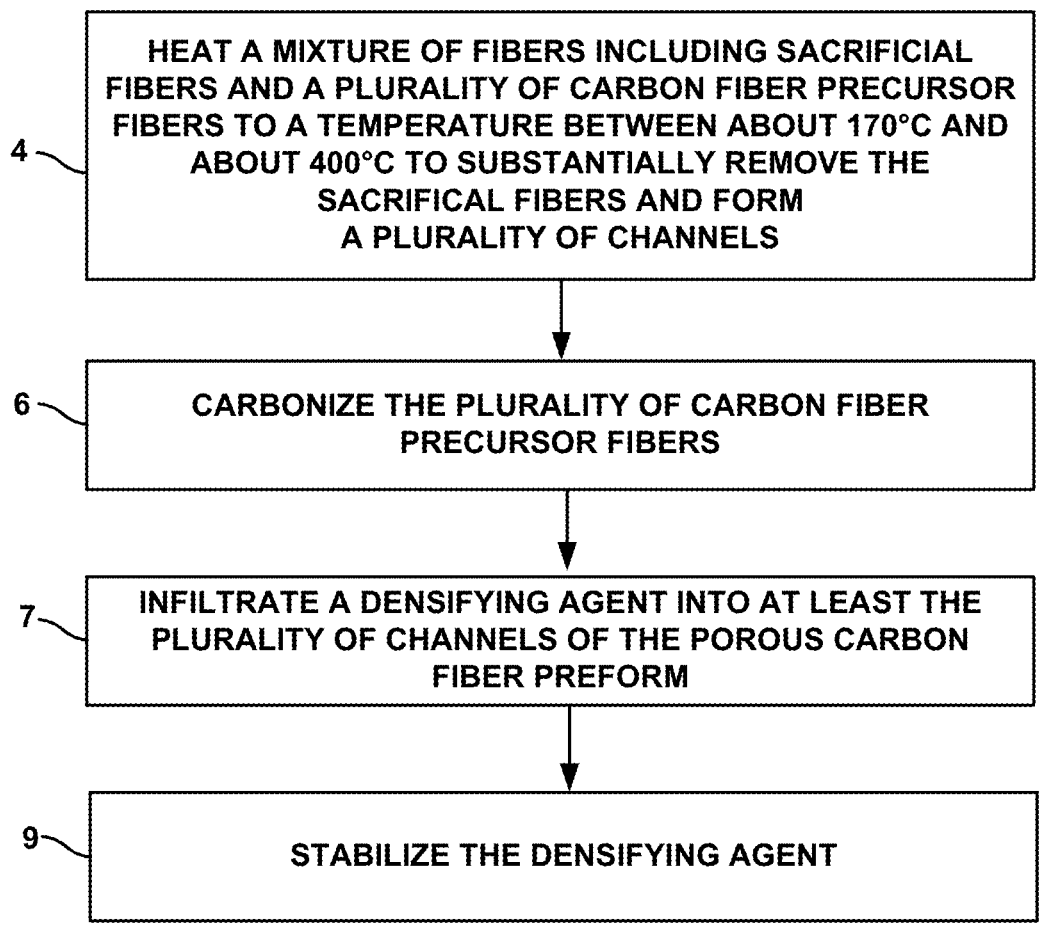
FIG. 1 is a flow diagram illustrating an example technique of forming a porous carbon fiber preform.

In general, the disclosure describes techniques utilizing sacrificial fibers that may be heated to be substantially removed from a precursor of a carbon-carbon composite material. In some examples, the sacrificial fibers may be mixed, incorporated into tows, needled, or otherwise combined with carbon fiber precursor fibers or carbon fibers to form a workpiece, such as a preform, woven or non-woven fabric, composite part, or intermediary thereof. Heating of the sacrificial fibers to substantially remove them may result in formation of additional porosity in the form of channels in the workpiece. The increased porosity may allow for enhanced ingress and/or egress of gases, liquids, or other volatiles with respect to inner portions of the workpiece being processed.

In some examples, a technique may include heating a mixture of fibers including sacrificial fibers and fibers of a carbon fiber precursor material, where the sacrificial fibers may be substantially removed (e.g., melted or burned) by heating at a temperature between about 170° C. and about 400° C. For example, a preform precursor may include fibers including a polymeric material that has a softening point between about 170° C. and about 400° C., such as polyethylene or polypropylene fibers. As other examples, sacrificial fibers may include hemp fibers, grass fibers, wood fibers, cotton fibers, fibers including an organic material, or the like. In such examples, upon being heated at a temperature between about 170° C. and about 400° C., the sacrificial fibers may ash or burn, such that negligible or no ash remains in place of the sacrificial fibers. Sacrificial fibers may be, for example, woven with carbon fiber precursors to form a fabric, incorporated with carbon fiber precursors in a non-woven fashion, may be needled into a woven or non-woven fabric or chopped carbon fiber precursors, or all fibers may be chopped and mixed to form a preform. Suitable carbon fiber precursor fibers may include polyacrylonitrile (PAN) fibers or pitch fibers.

When carbon fiber precursor fibers are being carbonized, or in a prior step of processing the preform, the sacrificial fibers may be heated such that they are substantially removed from the mixture of fibers. This may leave increased porosity in the preform, which may shorten paths of diffusion of gases within the preform or preform precursor. In some examples, the increased porosity (e.g., channels in place of the removed sacrificial fibers) may facilitate subsequent stabilization and/or densification steps. For example, if pitch is infiltrated into the pores and channels of a preform that has been formed using the techniques disclosed herein, when the preform is heated to stabilize the pitch, the pitch may shrink within the channels, pores, or both, forming a network of cracks through which oxygen can flow to participate in the stabilization reaction, as compared to preforms not made according to the disclosed techniques. In some examples, utilizing preforms including sacrificial fibers may shorten the stabilization process and the attendant overall time for producing carbon-carbon composite materials.

In some examples, a technique may include heating a mixture of fibers that includes sacrificial fibers and carbon fibers to a temperature between about 170° C. and about 400° C. to substantially remove the sacrificial fibers (e.g., by melting or burning off), leaving channels in a carbon fiber preform between the carbon fibers and in place of the sacrificial fibers. In some examples, the sacrificial fibers may include a polymeric material that has a softening point between about 170° C. and about 400° C. In some examples, carbon fibers mixed with the sacrificial fibers in this example may be coated with a resin, such as a phenolic of epoxy resin. The example technique may include infiltrating a densifying agent, such as pitch, into at least the channels of carbon fiber preform. In some examples, the pitch may be stabilized, for example by exposure to oxygen via at least some the plurality of channels, then carbonized. A carbon fiber preform including channels as described may prevent cracks or voids from forming in a final composite part, may shorten the stabilization process and the attendant overall time for producing carbon-carbon composite materials, or both.

FIG. 1 is a flow diagram illustrating an example technique of forming a porous carbon fiber preform. In some examples, a technique includes heating a mixture of fibers 18 that includes sacrificial fibers 22 and a plurality of carbon fiber precursor fibers 24 to a temperature between about 170° C. and about 400° C. to substantially remove the sacrificial fibers and form a plurality of channels (4), as described in greater detail herein (see, e.g., FIGS. 3-5).

Figure 2:
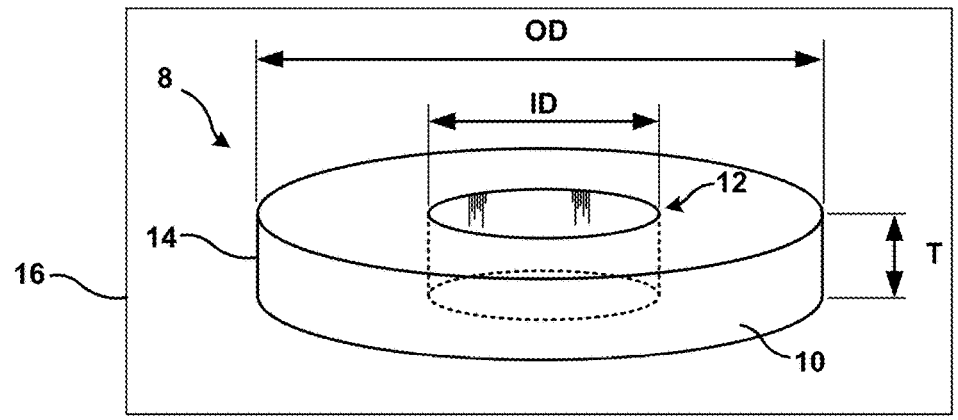
FIG. 2 is a conceptual diagram illustrating an example porous preform precursor having a disc-shaped geometry.

FIG. 2 is a conceptual diagram illustrating an example porous preform precursor 8 having a disc-shaped geometry. In some examples, as shown in FIG. 2, a porous preform precursor 8 may have a generally disc-shaped geometry so that a carbon-carbon composite material formed from porous preform precursor 8 may be generally disc-shaped, e.g., for use as a brake disc. In other examples, porous preform precursor 8, and a porous preform made therefrom, may define a different geometry. For example, the geometry of porous preform precursor 8 may be similar to or substantially the same as the desired geometry for the finished part formed by the carbon-carbon composite material.

Porous preform precursor 8 includes a disc-shaped porous body 10 with a central bore 12 extending through an axial thickness of disc-shaped porous body 10. In one example, porous preform precursor 8 has an inner diameter ID at bore 12, an outer diameter OD at an outer edge 14, and an axial thickness T, which is measured in a direction substantially orthogonal to the direction in which inner diameter ID and outer diameter OD are measured. Porous preform precursor 8 includes a mixture of fibers 18 (see FIG. 4), for example, a mixture of sacrificial fibers 22 and carbon fiber precursor fibers 24 or carbon fibers.

In some examples, the surfaces of the porous preform precursor 8 of FIG. 2 may be defined by a mold 16. For example, mold 16 may include one or more components that define a disc-shaped recess, such that when a mixture of fibers 18 is disposed within mold 16, the mixture of fibers 18 generally defines a three-dimensional disc, whose outline is shown in FIG. 2. In some examples, mold 16 may include a first component that includes surfaces that define a lower surface and outer edge 14 of porous preform precursor 8, as well as a centrally located cylinder of thickness T that leaves in its place bore 12 of preform precursor 8. In some examples in which porous preform precursor 8 defines a different geometry, mold 16 also may define a different geometry, e.g., a geometry corresponding to the negative of the geometry of porous preform precursor 8.

Figure 3:
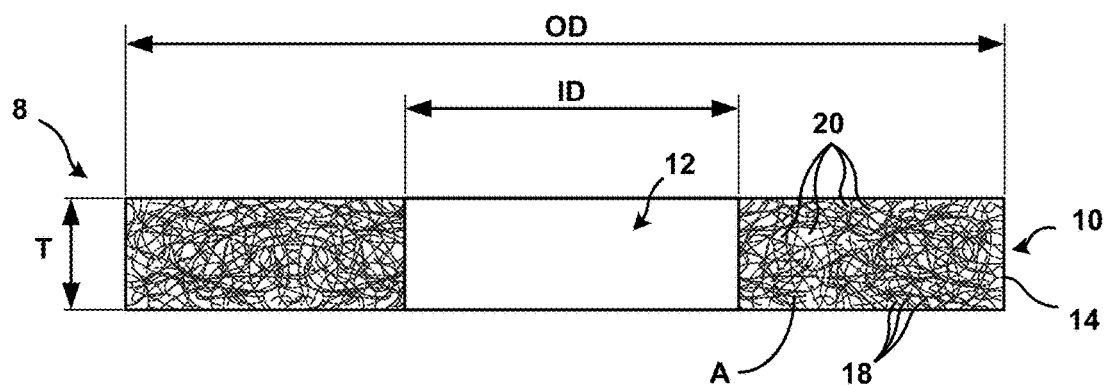
FIG. 3 is a conceptual diagram illustrating a lateral cross-sectional view of the example porous preform precursor of FIG. 2.

FIG. 3 is a conceptual diagram illustrating a lateral cross-sectional view of the example porous preform precursor 8 shown in FIG. 2, which is taken along a diameter of porous preform precursor 8. Porous body 10 of porous preform precursor 8 may include, for example, a woven, non-woven, or chopped mixture of fibers 18 that define a plurality of pores 20 within porous body 10. The porosity of porous body 10 extends substantially throughout the thickness T of porous body 10. For example, porous preform precursor 8 may include an article including a mixture of fibers, as described by this disclosure. In some examples, such an article may include mixture of fibers 18. Other articles may include mixture of fibers 53 as described below. An article including mixture of fibers 18 may include a plurality of sacrificial fibers 22, wherein each sacrificial fiber has a temperature of substantial removal between about 170° C. and about 400° C., such as a softening point or burning point of a sacrificial material included in the sacrificial fiber. Such a mixture of fibers 18 also may include, as described herein, a plurality of carbon fiber precursor fibers, or a plurality of carbon fibers in some examples. For examples, such an article may include sacrificial fibers 22 including a thermoplastic material, where the temperature of substantial removal of the thermoplastic material is a softening point of the thermoplastic material. As other examples, sacrificial fibers 22 may include hemp fibers, grass fibers, wood fibers, cotton fibers, fibers including an organic material, or the like. In such an example, the mixture of fibers 18 also may include carbon fiber precursor fibers, such as polyacrylonitrile (PAN) fibers or pitch fibers.

Figure 4:
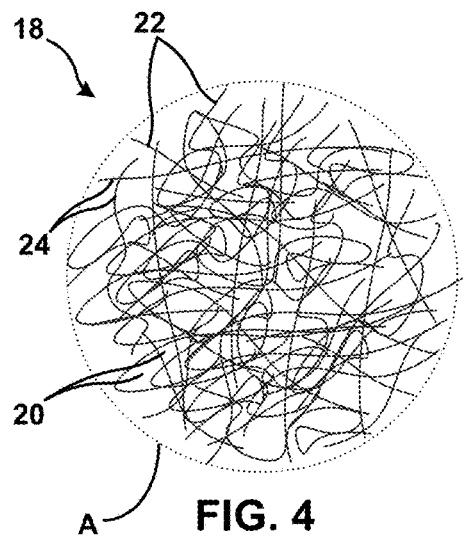
FIG. 4 is a close-up conceptual diagram illustrating section A of an example preform precursor designated in FIG. 3.

FIG. 4 illustrates a close-up conceptual diagram of section A designated in FIG. 3 of porous preform precursor 8 including mixture of fibers 18. As shown in FIG. 4, preform precursor 8 may include mixture of fibers 18 that define plurality of pores 20, where mixture of fibers 18 includes a mixture of sacrificial fibers 22 and carbon fiber precursor fibers 24. In some examples, the mixture of fibers 18 may be a substantially homogenous mixture (e.g., homogeneously mixed or nearly homogeneously mixed throughout the mixture). For example, the ratio of sacrificial fibers 22 to carbon fiber precursor fibers 24 may be relatively constant throughout a portion or all of mixture of fibers 18. In some examples, the sacrificial fibers 22 constitute between about 0.5% and about 10% of the total volume of mixture of fibers 18.

Mixture of fibers 18 may include sacrificial fibers 22 and carbon fiber precursor fibers 24. The sacrificial material of sacrificial fibers 22 may, in some examples, have a softening point between about 170° C. and about 400° C. For example, fibers including a polymeric material may have a softening point between about 170° C. and about 200° C. Suitable sacrificial fibers 22 may include a plurality of fibers including a polymeric material or a plurality of fibers including a thermoplastic material, for example, polyethylene fibers (such as low density polyethylene fibers) or polypropylene fibers. In some examples, the sacrificial fibers 22 may include polymeric material, non-polymeric material, or both. For example, a sacrificial fiber utilized in the techniques of this disclosure may include any fibrous material that is substantially removable (e.g., removable or nearly removable) by heat treatment in the range between about 170° C. and about 400° C. In some examples, sacrificial fibers may include hemp fibers, grass fibers, wood fibers, cotton fibers, fibers including an organic material, or the like. Suitable carbon fiber precursor fibers 24 may include, for example, polyacrylonitrile (PAN) fibers or pitch fibers. Further, heating the mixture of fibers 18 including sacrificial fibers and a plurality of carbon fiber precursor fibers to a temperature between about 170° C. and about 400° C. (4) may include, without limitation, heating the mixture of fibers 18 in an oven set at least to a temperature between about 170° C. and about 400° C.

Mixture of fibers 18 may take a number of forms. For example, mixture of fibers 18 may be bound together by a binder or resin, mixture of fibers 18 may be formed into a plurality of fibrous layers (not shown) that are bound or needle-punched together, or mixture of fibers 18 may be mechanically joined, e.g., using needle-punching, without previously being formed into distinct fibrous layers. Mixture of fibers 18 and pores 20 are not necessarily shown to scale, but rather are shown conceptually in order to illustrate aspects of the present disclosure.

The sacrificial fibers 22 may be mixed with carbon fiber precursor fibers 24 (or, in other examples, with carbon fibers) in a number of ways. For example, the mixture of fibers 18 may include a woven fabric, sheet, or tow, a non-woven fabric, sheet, or tow, or a plurality of chopped fibers. In some examples, a tow may include between 1,000 and 4,000 fibers. In some examples, when mixture of fibers 18 includes chopped fibers, the chopped fibers may have been formed by chopping a continuous tow in which sacrificial fibers 22 and carbon fiber precursor fibers 24 (or carbon fibers, in some examples) had been interwoven. The sacrificial fibers 22 and carbon fiber precursor fibers 24 also may be mixed randomly, without weaving. Such fibers (including tows), may be chopped separately before mixing, or together after mixing, using, for example, a chopper gun system.

The mixture of fibers 18 may be deposited into mold 16. In some examples, separate sacrificial fibers 22 and carbon fiber precursor fibers 24 (including, but not limited to, chopped fibers) may be mixed after they are introduced into a mold 16. In other examples, sacrificial fibers 22 and carbon fiber precursor fibers 24 may be mixed or blended prior to introduction into mold 16 or additional processing. For example, the sacrificial fibers 22 and the plurality of carbon fiber precursor fibers 24 may be deposited in mold 16 and mixed within the mold to form a preform precursor that includes mixture of fibers 18. As another example, sacrificial fibers 22 (such as low density polyethylene fibers) may be incorporated into a continuous tow for producing a woven or non-woven fabric used for layups to form a preform. Such fabrics may possess anisotropic properties. Alternatively, as discussed, a tow may be chopped, such that sacrificial fibers 22 and carbon fiber precursor fibers 24 may be randomly mixed and processed to form a preform precursor or preform having generally isotropic properties.

In some examples, the mixture of fibers 18 of the technique of FIG. 1 may include sacrificial fibers 22 that are incorporated with carbon fiber precursor fibers 24 by needling, such that sacrificial fibers 22 mechanically bind together at least some of carbon fiber precursor fibers 24. In all examples, additional sacrificial fibers 22 may or may not already have been mixed with carbon fiber precursor fibers 24 when such needling is performed. The incorporation of sacrificial fibers 22 via needling may apply to, for example, woven, non-woven, or chopped tows, as well as layers of fabric including at least carbon fiber precursor fibers 24. The process of needling may include engagement of sacrificial fibers 22 with or by a needle, such that a sufficient force is applied to sacrificial fibers 22 by one or more needles (for example, in an automated fashion) to make the sacrificial fibers 22 mechanically bind together at least some of carbon fiber precursor fibers 24. When needled sacrificial fibers 22 are heated at least to the a temperature between about 170° C. and about 400° C. and melt or burn away, plurality of channels 26 left in their place may allow enhanced ingress and egress of liquids or gas in a direction parallel to the thickness of the workpiece (see, for instance, thickness "T" of the example article in FIG. 2), such as in a z direction.

In mixture of fibers 18 including a non-woven fabric, the sacrificial fibers 22 may have an average length of about 2.5 inches, in some examples. In examples where layers of fabric or mixture of fibers 18 in other forms are needled with sacrificial fibers 22, to produce a preform of a desired thickness, the sacrificial fiber 22 may be up to three inches in length, depending on the layer and/or desired preform thickness. In other examples, including for randomly mixed chopped fibers, one or more continuous fibers including the sacrificial material or materials of sacrificial fiber 22 can be wound around carbon fiber precursor fibers 24, to form the mixture of fibers. Such a continuous sacrificial fiber 22 may be of any suitable length.

Returning now to FIG. 1, as discussed above, the example technique includes heating mixture of fibers 18 to a temperature between about 170° C. and about 400° C. to substantially remove (e.g., remove or nearly remove) the sacrificial fibers 22 from mixture of fibers 18 and form a plurality of channels 26 in the preform precursor between plurality of carbon fiber precursor fibers 24 in place of the sacrificial fibers 22 (4). In this way, the sacrificial fibers 22 may be substantially removed from the mixture of fibers 18, leaving in their place the plurality of channels 26 between the plurality of carbon fiber precursor fibers 24 in a preform precursor. In some examples, a sacrificial fibers 22 may include any fibrous material that is substantially removable (e.g., removable or nearly removable) by heat treatment in the range between about 170° C. and about 400° C. In some examples, sacrificial fibers 22 may include fibers including a polymeric or thermoplastic material that has a softening point between about 170° C. and about 400° C. In some examples, sacrificial fibers 22 may include hemp fibers, grass fibers, wood fibers, cotton fibers, fibers including organic material, or the like. In some examples, upon being heated at a temperature between about 170° C. and about 400° C., the sacrificial fibers 22 may ash or burn, such that negligible or no ash remains in place of the sacrificial fibers. In other examples, as noted, heating of the sacrificial fibers 22 to a temperature between about 170° C. and about 400° C. may cause the sacrificial fibers 22 to reach a softening point of one or more sacrificial materials 22 of which they are composed, such that the sacrificial material and/or sacrificial fibers 22 melt or burn out of the preform precursor, preform, or workpiece.

Figure 5:
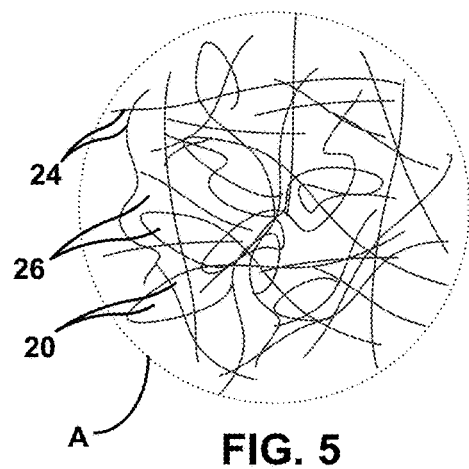
FIG. 5 is a close-up conceptual diagram illustrating section A of an example preform precursor designated in FIG. 3 after removal of sacrificial fibers.

FIG. 5 illustrates the close-up conceptual diagram of section A designated in FIG. 3 of porous preform precursor 8 after removal of sacrificial fibers 22 by heating of mixture of fibers 18 to a temperature between about 170° C. and about 400° C. As shown in FIG. 5, porous preform precursor 8 includes additional porosity in the form of a plurality of channels 26 between the plurality of carbon fiber precursor fibers 24 after sacrificial fibers 22 have been substantially removed.

The technique of FIG. 1 also includes carbonizing plurality of carbon fiber precursors 24 to form a plurality of carbon fibers (6). In some examples, heating mixture 18 of sacrificial fibers 22 and carbon fiber precursor fibers 24 to a temperature between about 170° C. and about 400° C. (4) and carbonizing plurality of carbon fiber precursor fibers 24 (6) may be performed in a single, continuous heating step. For example, mixture of fibers 18 may be placed in a mold, and, as the temperature is rising toward a higher carbonizing temperature, sacrificial fibers 22 may be melt or burn away as the temperature passes through a softening point or combustion point, respectively, in the temperature range between about 170° C. and about 400° C. In such a step, the sacrificial fibers 22 may soften, melt away, burn away, and/or vaporize from porous preform precursor 8, leaving in their place additional porosity in the form of channels 26 throughout the network of carbon fiber precursor fibers 24 (which are then carbonized to carbon fibers).

In general, heating mixture of fibers 18 to a temperature between about 170° C. and about 400° C. may cause sacrificial material within sacrificial fibers 22 and/or sacrificial fibers 22 to soften, melt away, and/or vaporize from the preform precursor. Upon heating mixture of fibers 18 to substantially remove sacrificial fibers 22, the remaining channels 26 may facilitate the ingress and/or egress of fluids, such as gases. Thus, introduction of sacrificial fibers 22 and subsequent removal of sacrificial fibers 22 may shorten paths of diffusion within a preform precursor or preform, leading to shorter manufacturing cycle times.

Figure 6:
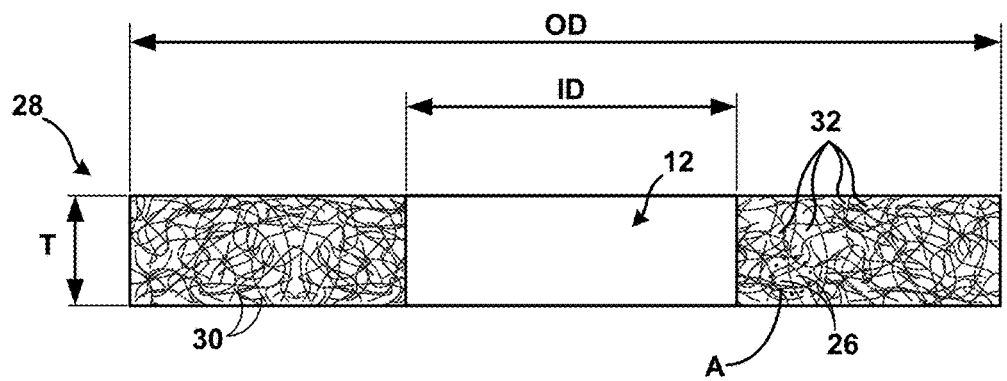
FIG. 6 is a conceptual diagram illustrating a lateral cross-sectional view of an example porous carbon fiber preform.
Figure 7:
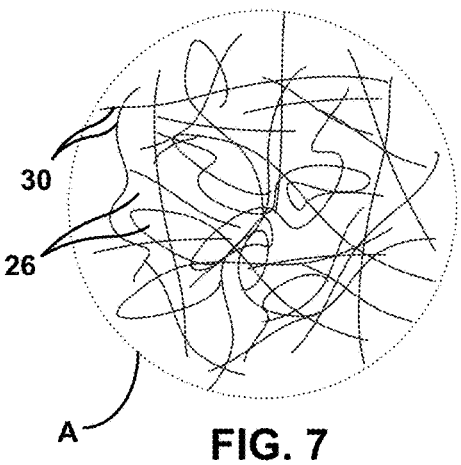
FIG. 7 is a close-up conceptual diagram illustrating section A of an example porous carbon fiber preform designated in FIG. 6.

As stated, the technique of FIG. 1 further includes carbonizing the plurality of carbon fiber precursor fibers 24 to form a porous carbon fiber preform 28 (6). FIG. 6 is a conceptual diagram illustrating a lateral cross-sectional view of the example porous carbon fiber preform 28, which is taken along a diameter of example carbon fiber preform 28. FIG. 7 illustrates a close-up conceptual diagram of section A designated in FIG. 6 of example carbon fiber preform 28, showing, for example, and plurality of carbon fibers 30 and plurality of channels 26 left behind when sacrificial fibers 22 were substantially removed.

The temperature of carbonization (e.g., converting the carbon fiber precursor fibers to carbon) may vary depending on the content of the carbon fiber precursor fibers. For example, the temperature of carbonization of PAN fibers may be between about 1500° C. and about 2700° C., and the temperature of carbonization of pitch fibers may be between about 1600° C. and about 2700° C. In some examples the plurality of channels 26 remaining after removal of the sacrificial fibers 22 may have substantially the same volume (e.g., the same or nearly the same volume) pre-carbonization in the preform precursor, as compared to post-carbonization. In other examples, the volume of plurality of channels 26 may increase.

Figure 8:
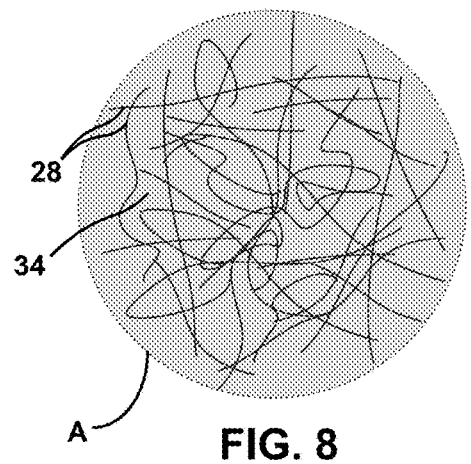
FIG. 8 is a close-up conceptual diagram illustrating section A of the example porous carbon fiber preform designated in FIG. 6 after infiltration of a densifying agent into a plurality of channels and a plurality of pores defined within the preform.

The technique of FIG. 1 may further include, after carbonizing, infiltrating a densifying agent 34 into at least the plurality of channels 26 of porous carbon fiber preform 28 (7). FIG. 8 illustrates a close-up conceptual diagram of section A designated in FIG. 6 of example carbon fiber preform 28 after infiltration of densifying agent 34 into plurality of channels 26 and plurality of pores 32. Densifying agent 34 may be infiltrated into porous carbon fiber preform 28 using at least one of several processes, for example, chemical vapor deposition/chemical vapor infiltration (CVD/CVI), vacuum pressure infiltration (VPI), high pressure impregnation/carbonization (PIC), or resin transfer molding (RTM). Densifying agent 34 may include, for example, a mesophase pitch (such as coal tar, petroleum, or synthetic pitch) or a phenolic material.

The example technique of FIG. 1 also may include stabilizing densifying agent 34 (9) infiltrated at least in plurality of channels 26 (and also, for example, in plurality of pores 32). Stabilizing densifying agent 34 may include exposing densifying agent 34 to an oxidizing agent, such as oxygen gas. In some circumstances, without a preform with enhanced porosity (such as porous carbon fiber preform 28 including plurality of channels 26 discussed herein), ingress of the oxidizing agent into the interior of porous carbon fiber preform 28 may take significant time, as the oxidizing agent may need to diffuse through the pitch to reach the interior of porous carbon fiber preform 28. Forming channels 26 in the preform precursor may provide greater porosity in porous carbon fiber preform 28, which may speed ingress of the oxidizing agent into the interior of porous carbon fiber preform 28.

In this way, mixing sacrificial fibers 22 with carbon fiber precursors may accelerate and enhance the stabilization process during preform processing, by, for example, more quickly converting a thermoplastic mesophase pitch to a thermoset pitch. Stabilization may reduce or substantially prevent pitch from running out of a preform during subsequent carbonization. The techniques of this disclosure also may result in improved yield rates of carbon in densified preforms and/or carbon-carbon composite materials, such as carbon-carbon brake discs, as compared to manufacturing processes that do not utilize preforms whose process of manufacture includes the forming of channels using sacrificial fibers.

In some examples, channels 26 additionally or alternatively may prevent or reduce cracking of porous carbon fiber preform 28 or bubbling of water vapor or other gases from within porous carbon fiber preform 28 during carbonization processing. During certain stages of the manufacturing of a composite material, such as infiltration of a densifying agent (7), stabilizing the densifying agent (9), or both, liquids, gases, or any number of volatiles may be generated inside porous preform precursor 8 or porous carbon fiber preform 28. The rate at which such liquids or gases may be evacuated from within porous preform precursor 8 or porous carbon fiber preform 28 may be influenced by a number of factors, including the porosity of the preform, the temperature at which the processing is proceeding, the composition of the gas, or the like.

Figure 9:
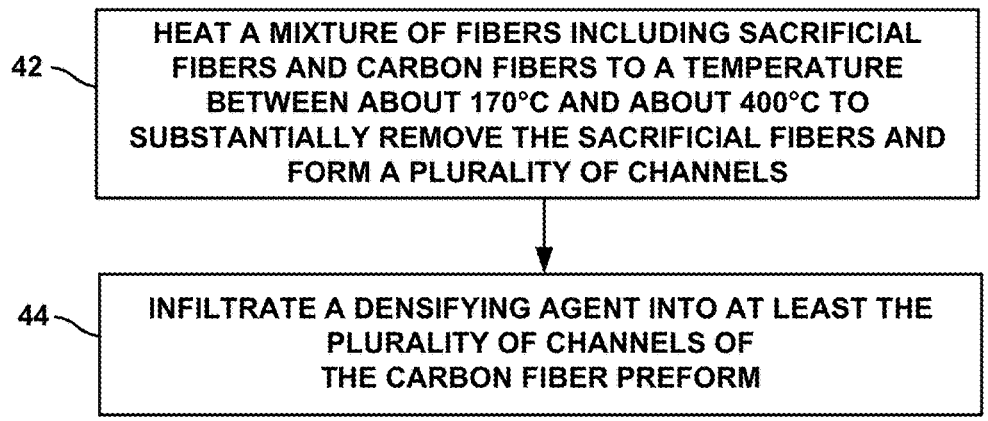
FIG. 9 is a flow diagram illustrating an example technique for forming an infiltrated carbon fiber preform.

FIG. 9 is a flow diagram illustrating an example technique for forming an infiltrated carbon fiber preform. The technique of FIG. 9 is similar to the technique of FIG. 1, and certain steps and other aspects of the technique of FIG. 9 may be similar to or the same as the technique described with respect to FIG. 1. The technique of FIG. 9 includes heating a mixture of fibers 53 that includes sacrificial fibers 48 and carbon fibers 50 to a temperature between about 170° C. and about 400° C. (see FIG. 10) (42). Heating at such a temperature may substantially remove (e.g., remove or nearly remove) the sacrificial fibers 48 and form a plurality of channels 52 between carbon fibers 50 in a carbon fiber preform 46 in place of the sacrificial fibers 48 (see FIG. 10) (42). In some examples, mixture of fibers 53 may be heated to a temperature between about 170° C. and 200° C. to substantially remove the sacrificial fibers 48. When heated to a temperature between about 170° C. and about 400° C., for example to a softening point of a polymeric material, sacrificial fibers 48 may soften or melt and drip out of the carbon fiber preform, or vaporize. As discussed with respect to the technique of FIG. 1, in some examples of the technique of FIG. 9, sacrificial fibers 22 may include a polymeric material, hemp fibers, grass fibers, wood fibers, cotton fibers, fibers including organic material, or the like. In such examples, upon being heated at a temperature between about 170° C. and about 400° C., the sacrificial fibers may soften, melt, ash, or burn, such that negligible or no sacrificial fibers 22 remains within mixture of fibers 53.

Figure 10:
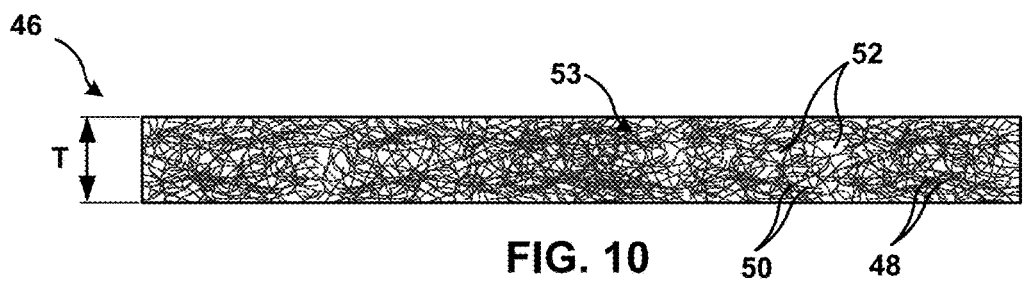
FIG. 10 is a conceptual diagram illustrating a lateral cross-sectional view of an example carbon fiber preform.

FIG. 10 is a conceptual diagram illustrating a lateral cross-sectional view of an example carbon fiber preform 46, which includes mixture of fibers 53 as described. Carbon fiber preform 46 may include, for example, an article including mixture of fibers 53, such as a plurality of sacrificial fibers 48 and a plurality of carbon fibers 50. Carbon fiber preform 46 may have a thickness T, measured from a top surface to a bottom surface of the preform (or in some examples, preform precursor). The example carbon fiber preform 46 of FIG. 10 has the same disc-shaped geometry of the example porous preform precursor shown in FIG. 2. However, carbon fiber preform 46 may possess any number of geometries, and the example set forth at FIG. 10 is not intended to be limiting. Mixture of fibers 53 may be prepared in any similar or same manner as the mixture of fibers 18 discussed with respect to the technique of FIG. 1. In some examples, carbon fiber preform 46 may include a substantially homogeneous (homogeneous or nearly homogeneous) mixture of fibers 53. For example, the ratio of sacrificial fibers 48 to carbon fibers 50 may be relatively constant throughout a portion or all of the preform. In some examples, sacrificial fibers 48 and carbon fibers 50 may be woven in a substantially homogeneous pattern throughout a portion or all of preform 46, such as in the form of a fabric or sheet. A technique of this disclosure may include, for example, prior to heating mixture of fibers 53, forming a woven tow or non-woven tow including the sacrificial fibers 48 and the carbon fibers 50.

In some examples, prior to heating the mixture of fibers 53 (42), an example technique of this disclosure may include coating carbon fibers 50 with a resin. A suitable resin may include, for example, a phenolic resin or an epoxy resin. Coating of the fibers may be achieved, for example, by dipping the carbon fibers 50 in the resin, such as in a bath of resin having a viscosity that is sufficiently low to efficiently coat the carbon fibers. In other examples, resin may be sprayed on the carbon fibers 50. Resin that is coated on a carbon fiber, as described, may in some examples constitute between about 40% and about 50% of the total weight of a resin-coated fiber.

Such a technique also may include, prior to heating the mixture of fibers 53, drying the coated carbon fibers. Such drying may be achieved, for example, by heating the coated carbon fibers in an oven at a suitable temperature, such as a relatively low temperature. Resin-coated carbon fibers, including dried resin-coated carbon fibers, also may be chopped prior to or while being mixed with sacrificial fibers to form the mixture of fibers. Chopping may be achieved, for example, by use of a chopper gun system, or other suitable methods.

In example techniques that include a mixture of fibers including resin-coated carbon fibers (including but not limited to chopped and/or dried resin-coated fibers), the resin-coated carbon fibers may be mixed with sacrificial fibers to form the mixture of fibers used in the technique of FIG. 9. Any of the techniques used to form the mixture of fibers described with respect to the technique of FIG. 1 may also be used to form the mixture of fibers for techniques including the mixture of fibers that include resin-coated carbon fibers, or mixture of fibers 53 in general.

In some examples that include dried resin-coated fibers, such as chopped, dried resin-coated fibers, the resin may be melted prior to, or in the same step as, heating the mixture of fibers to a temperature between about 170° C. and about 400° C. (42), as described herein. In other examples, a resin may be coated on the carbon fibers, and the resin may maintain its viscosity (without substantial drying) as the mixture of fibers is prepared and heated at least to a temperature between about 170° C. and about 400° C. Whether the resin has maintained its viscosity or been dried then melted, a mixture of fibers including the resin-coated fibers and sacrificial fibers may be compressed, for example, such that the compressed mixture of fibers takes the form of a final part or composite.

In some examples that include compressing the mixture of fibers, the step of compressing may occur before, or at the same time, as heating the mixture of fibers at least to a temperature between about 170° C. and about 400° C. to substantially remove the sacrificial fibers (42). If the compression step is performed after heating to a temperature in this range, the material compressed may include the resin-coated carbon fibers, but may not include the sacrificial material in the sacrificial fibers 22 and/or the sacrificial fibers 22 that has melted or burned away. Some example techniques also may include, prior to infiltrating the densifying agent in the plurality of channels 52 (44), carbonizing at least the resin, to form a partially densified porous carbon fiber preform. In some examples, the referenced steps of melting the resin, heating at least to a temperature between about 170° C. and about 400° C., and/or carbonizing of at least the resin may occur in one continuous heating step. Likewise, an optional step of carbonizing at least the resin coated on the carbon fibers may occur while the mixture of fibers is being compressed, or while the resin-coated fibers remaining after removal of the sacrificial material and/or sacrificial fibers 22 are being compressed.

Some example techniques of this disclosure may include, prior to heating the mixture of fibers including the sacrificial fibers and carbon fibers to a temperature between about 170° C. and about 400° C. (42), impregnating one or more matrix precursor materials into the mixture of fibers 53 and/or carbon fiber preform 46. Matrix precursor materials may include, in some examples, an uncured resin and a curing agent or catalyst. For example, an uncured phenolic resin may be impregnated into the mixture of fibers 53 or carbon fiber preform 46 along with hexamethylenediamine. In general, matrix precursor materials of this disclosure may include one or more materials that may subsequently be cured to form a matrix around the mixture of fibers 53. Particular amounts of one or more matrix precursor materials may be pre-impregnated into the mixture of fibers 53 or carbon fiber preform (commonly referred to as "prepregs") by any number of suitable methods. For example, matrix precursor materials may be impregnated using pressure, a vacuum, resin transfer molding, manual application, or any combination thereof.

In some examples, after impregnation and prior to heating to a temperature between about 170° C. and about 400° C. (44), one or more matrix precursor materials impregnated in the sheet may be partially cured (sometimes referred to as a "B-stage" prepreg). In such an example, a mixture of fibers 53 or carbon fiber preform 46 in which the matrix material precursor has been partially cured may be easier to handle and, for example, may be stored for future processing. In some examples, a B-stage prepreg may be stored in cool conditions to prevent or limit curing of the uncured portion of the matrix precursor material. In an example technique when one or more matrix material precursors has been partially cured, upon heating mixture of fibers 53 at least to a temperature between about 170° C. and about 400° C., a plurality of channels may be formed within the partially cured one or more matrix precursor materials between the plurality of carbon fibers, in place of the sacrificial fibers 48.

Example techniques that include impregnation of one or more matrix materials also may include curing the one or more matrix precursor materials, prior to heating the mixture of fibers 53 to a temperature between about 170° C. and about 400° C. Curing may include causing a chemical reaction to occur between an uncured resin and the curing agent or catalyst to form a cured matrix. The cured matrix may provide enhanced structure and stability to mixture of fibers 53, prior to additional processing.

In some examples, when the matrix precursor has been partially cured prior to heating mixture of fibers 53 at least to a temperature between about 170° C. and about 400° C., curing one or more matrix precursor materials includes fully curing the uncured remainder of one or more matrix precursor materials impregnated in the mixture of fibers 53 or carbon fiber preform 46. Additionally or alternatively, the steps of heating mixture of fibers 53 at least to a temperature between about 170° C. and about 400° C. and curing one or more matrix precursor materials, according to an example technique, may include continuously heating the impregnated mixture of fibers or preform from a temperature below a softening or combustion point of a sacrificial material in the range of about 170° C. to about 400° C. to a temperature at which one or more matrix precursor materials cures to form a matrix that binds the mixture of fibers. In general, curing of matrix material precursors impregnated in sheets, as described by this disclosure, may be accomplished by any number of suitable methods, for example, heating to a temperature of between about 100° C. to about 300° C.

The example technique of FIG. 9 also includes infiltrating a densifying agent into at least the plurality of channels 52 of carbon fiber preform 46 (44). This step may be similar to or the same as the optional step of infiltration of a densifying agent described above. For example, a suitable densifying agent 54 may include a mesophase pitch (such as coal tar, petroleum, or synthetic pitch) or a phenolic material (see FIG. 11). Infiltration of densifying agent 54 may be performed by any number of techniques, the selection of which may depend on the viscosity or other properties of the densifying agent. For example, densifying agent 54 may be infiltrated into carbon fiber preform 46 using at least one of chemical vapor deposition/chemical vapor infiltration (CVD/CVI), vacuum pressure infiltration (VPI), high pressure impregnation/carbonization (PIC), or resin transfer molding (RTM)

Figure 11:
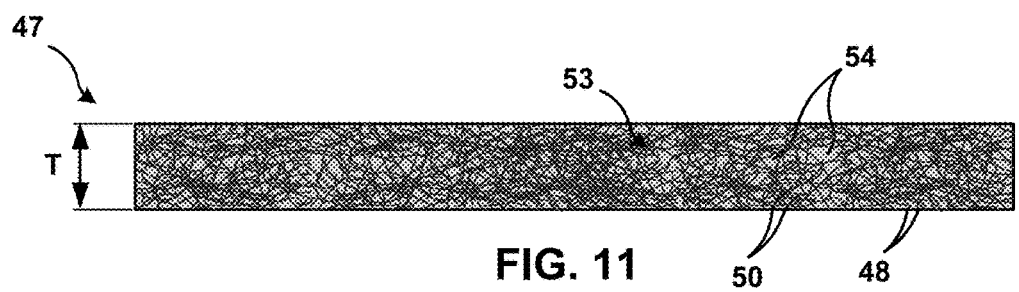
FIG. 11 is a conceptual diagram illustrating a lateral cross-sectional view of an example infiltrated carbon preform.

FIG. 11 is a conceptual diagram illustrating a lateral cross-sectional view of an example infiltrated carbon preform 47. Infiltrated carbon preform 47 shows carbon preform 46 of FIG. 10 after plurality of channels 52 between carbon fibers 50 have been infiltrated with densifying agent 54. An example technique of this disclosure also may include carbonizing densifying agent 54 to form a carbon-carbon composite article or part, under conditions as described herein.

After formation of the partially densified porous carbon preform, densifying agent 54 may be infiltrated into the partially densified porous carbon preform. Subsequent to infiltration, densifying agent 54 may be stabilized and/or carbonized, as described elsewhere in this disclosure. As also described herein, stabilization of the densifying agent 54 (such as pitch) may be enhanced by the presence of plurality of channels 52, by virtue of their allowance of more oxygen (or other oxidizing agent) to penetrate an inner portion of the infiltrated preform 47. In this way, a preform including a better-stabilized densifying agent may be carbonized more effectively, with a higher carbon yield in the final carbon-carbon composite part.

A carbon fiber preform that has been formed according to the techniques of this disclosure may include additional porosity in the form of the described plurality of channels, as compared to preforms formed without including sacrificial fibers that may be substantially removed at a temperature between about 170° C. and about 400° C. A preform including such channels may prevent or limit cracks or voids from forming in the preform, or in a final composite part made therefrom. Cracks or voids of such a nature may diminish desired mechanical properties of the preform or composite part. For example, water may be a byproduct of a condensation reaction during the curing process of certain matrix materials (such as the curing of epoxy resin). If sufficient channels for evacuation of water or water vapor are not provided, water or water vapor may remain within a sheet, preform, or partially densified preform, and cause cracking during subsequent processing, such as when densifying agents are carbonized. Accordingly, utilizing fibrous sacrificial materials that may be removed at temperature between about 170° C. and about 400° C., such as fibers including a polymeric material with a softening point in this range, in forming carbon fiber preforms may reduce manufacturing cycle times, as channels formed after softening, melting, and/or burning of the sacrificial fibers may allow faster ramp (e.g., heating) rates and shorter hold times at desired temperatures. For example, hold times may be between about 20% to about 40% shorter using the techniques described in this disclosure. Ultimate yields of carbon content in preforms and carbon-carbon composite parts also may be increased by use of the techniques described.

Various embodiments of the invention have been described. These and other embodiments are within the scope of the following claims.

The invention claimed is:
1. A method comprising:
heating a mixture of fibers comprising randomly oriented sacrificial fibers and a plurality of carbon fiber precursor fibers to a temperature between about 170° C. and about 400° C. to substantially remove the sacrificial fibers from the mixture of fibers and form a plurality of channels in a preform precursor between the plurality of carbon fiber precursor fibers in place of the sacrifi- cial fibers, wherein the sacrificial fibers comprise fibers including a polymeric material, the polymeric material comprises a thermoplastic material, and wherein heating the mixture of fibers comprises melting the sacrificial fibers; and carbonizing the plurality of carbon fiber precursor fibers to form a porous carbon fiber preform comprising the plurality of channels.

2. The method of claim 1, further comprising:
prior to heating the mixture of fibers, depositing the mixture of fibers in a mold.

3. The method of claim 1, wherein the sacrificial fibers comprise at least one of polyethylene fibers or polypropylene fibers.

4. The method of claim 1, wherein the plurality of carbon fiber precursor fibers comprises at least one of polyacrylonitrile (PAN) fibers or pitch fibers.

5. The method of claim 1, wherein the mixture of fibers comprises at least one of:
- a woven fabric or tow including the plurality of carbon fiber precursor fibers and the sacrificial fibers including the thermoplastic material;
- a non-woven mixture or tow of the plurality of carbon fiber precursor fibers and the sacrificial fibers including the thermoplastic material; or
- a plurality of chopped fibers including the plurality of carbon fiber precursor fibers and the sacrificial fibers including the thermoplastic material.

6. The method of claim 1, further comprising, after forming the porous carbon fiber preform, infiltrating a densifying agent into at least the plurality of channels of the porous carbon fiber preform, and stabilizing the densifying agent.

7. A method comprising:
weaving a plurality of fiber tows to form a fabric, wherein at least one fiber tow of the plurality of fiber tows comprises a mixture of fibers comprising sacrificial fibers mixed with at least one of carbon fibers or carbon fiber precursor fibers;
heating the fabric comprising the fiber tows to a temperature between about 170° C. and about 400° C. to substantially remove the sacrificial fibers from the at least one fiber tow and form a plurality of channels between the carbon fibers or carbon fiber precursor fibers in place of the sacrificial fibers to form a carbon fiber preform, wherein the sacrificial fibers comprise fibers including a polymeric material; and
infiltrating a densifying agent into at least the plurality of channels of the carbon fiber preform.

8. The method of claim 7, further comprising, prior to heating the fabric, coating the carbon fibers or carbon fiber precursor fibers with a resin.

9. The method of claim 8, wherein the resin comprises one of a phenolic resin or an epoxy resin.

10. The method of claim 8, further comprising compressing the fabric including the resin-coated carbon fibers or carbon fiber precursor fibers and the sacrificial fibers and, prior to infiltrating the densifying agent, carbonizing at least the resin.

11. The method of claim 7, wherein the sacrificial fibers of the at least one fiber tow comprises a first plurality of sacrificial fibers, the method further comprising, prior to heating the fabric:
forming at least one additional fibrous layer comprising a second plurality of sacrificial fibers mixed with at least one of carbon fibers or carbon precursor fibers; and
needling the fabric and the at least one additional fibrous layer together, such that the at least some of the second plurality of sacrificial fibers mechanically bind the fabric and the at least on additional fibrous layer together.

12. The method of claim 7, further comprising stabilizing or carbonizing the densifying agent.

13. The method of claim 7, wherein the sacrificial fibers comprise at least one of polyethylene fibers or polypropylene fibers.

14. The method of claim 11, wherein forming the least one additional fibrous layer comprises forming a non-woven layer of fibers.

* * * * *